April 1, 1969  H. C. BANAS  3,435,492

RETAINING LATCH

Filed Aug. 25, 1966

INVENTOR.
HENRY C. BANAS
BY
Jack C. Munro
- AGENT -

United States Patent Office 3,435,492
Patented Apr. 1, 1969

3,435,492
RETAINING LATCH
Henry C. Banas, Costa Mesa, Calif., assignor, by mesne assignments, to McDonnell Douglas Corporation, Santa Monica, Calif., a corporation of Maryland
Filed Aug. 25, 1966, Ser. No. 575,059
Int. Cl. F16b 9/02; B65g 11/10; B64d 25/00
U.S. Cl. 24—230                     1 Claim

ABSTRACT OF THE DISCLOSURE

A latch assembly for coupling the end of a flexible evacuation slide to an aircraft floor. A pair of spaced latch housings anchored to the floor, which cooperate to retain a latchable member, attached to the end of the slide, therebetween, each of the housings including a spring biased, pivotal arm which is movable between the latched position and unlatched position.

---

This invention relates to a latch assembly which is to retain a planar member against movement and more particularly to a pair of latches which retain an elongated bar member against all possible movements.

In aircraft, it is common to employ an apparatus to evacuate passengers in the event of an emergency landing. One such an apparatus is an inflatable slide which when actuated allows the safe disembarkment of the passengers. An evacuation apparatus of this type is needed because present day aircraft are so large that in an emergency landing, the passenger doors may be several feet above the ground. It is also necessary to have the slide actuated in the shortest possible time as the aircraft may be on fire or other such emergency situation which requires quickness in the evacuation of the passengers.

Therefore, this invention is to be employed with an inflatable evacuation slide located in aircraft. The slide is contained in the uninflated condition within a container mounted on the interior side of the passenger door. Usually more than one passenger door is located within each aircraft, a contained slide assembly to be mounted on each of the doors. It is desirable to actuate the slide upon the single movement of opening of the door. For this purpose the latch of this invention is employed.

Specifically a pair of latches of this invention are to be mounted in a spaced, in-line relationship on the floor of the aircraft. A bar member is to be held therebetween, the bar member being attached to a portion of the inflatable slide which protrudes from the slide container. Upon opening of the door the retained bar causes removal of the evacuation slide, the slide then being inflated and functioning to allow safe passenger evacuation. Each latch includes a pivoted lever which is spring biased to a first or latched position, the lever being pivotable to a second or unlatched position. When in the latched position the lever prevents movement of an end portion of the retained bar. However, the intended use of this invention should in no way limit this invention as any use is conceivably within the scope of this invention where it is desirable to employ a latch of such an operation and function.

It is an object of this invention to provide a latch of simple construction, yet which securely retains a bar member and prevent accidental release.

Another object of this invention is to provide a latch which facilitates ease of the latching procedure.

Other objects and features of the invention will become apparent as the description proceeds, especially when taken in conjunction with the accompanying drawing illustrating an embodiment of the invention, wherein.

Figure 1:
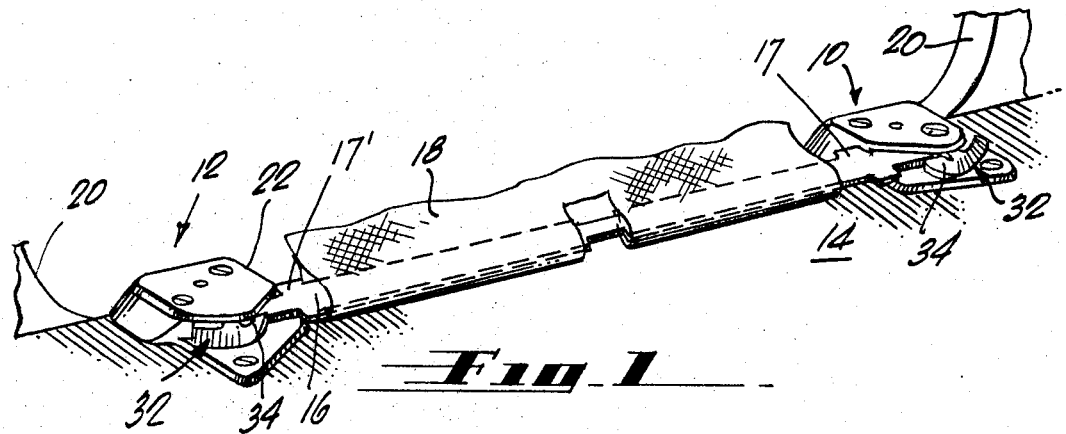
FIGURE 1 is a pictorial view of a pair of the latches of this invention shown as installed adjacent a door of an aircraft.
Figure 2:
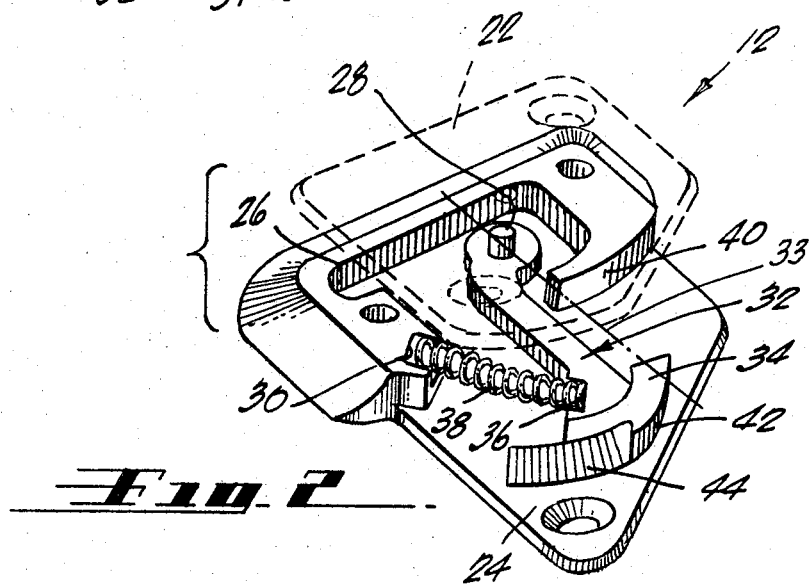
FIG. 2 is an exploded cut-away of a latch of this invention showing the interior construction of the latch.
Figure 3:
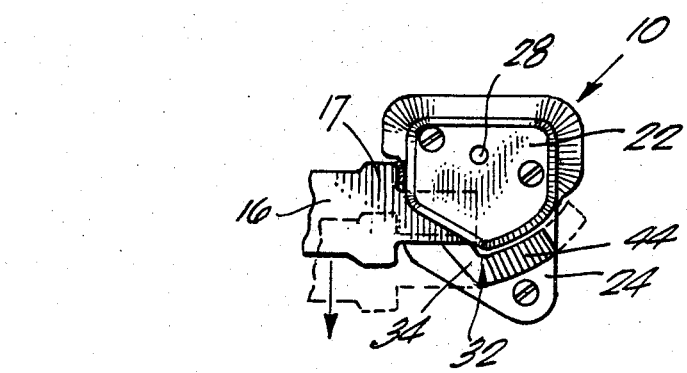
FIG. 3 is a plan view of one of the latches shown in FIG. 1.

As shown in FIG. 1 a right-hand latch 10 and a left-hand latch 12 are mounted to the floor 14 of an aircraft. A bar 16 is retained between latches 10 and 12, bar 16 being connected to end portion 18 of the evacuation slide. The evacuation slide (not shown) is to be mounted on the aircraft door 20. The latches 10 and 12 are mirror duplicates and are to cooperate in the retaining of bar 16. It is apparent from the drawing that both latches 10 and 12 are required to retain bar 16, a single latch in itself being insufficient. Bar 16 is formed at each end with shoulders 17 and 17'. Shoulders 17 and 17' are to contact housing 26 and limit transverse bar movement within the respective latches 10 and 12.

Each of the latches 10 and 12 are constructed to include a top plate 22 and a base plate 24. Integrally formed with base plate 24 is a housing 26, housing 26 being closed on three sides and open on one side. Housing 26 includes an upstanding pivot pin 28 and a recess 30. A latching arm 32 is pivotally mounted on pivot pin 28 and limited in the pivoting movement by the dimension of the open side of the housing 26. Arm 32 is designed so a line 33, passing through pivot pin 28 and parallel to arm 32, junctions with the mid-point of head 34. Thereupon, any force from bar 16 tending to push arm 32 outwardly will be transmitted in the direction of line 33 and not tend to open the latch. Arm 32 has a head portion 34 and a recess 36 formed on the back side of head portion 34. A coil spring 38 is situated within recesses 30 and 36 and functions to force arm 32 to the latched or most extended position. Abutment 40 of housing 26 functions as a stop for arm 32 in the latched position and also as a portion of the strike of the latch. Abutment 40 performs similar to a strike in that it prevents movement of bar 16 in one direction. Head portion 34 is beveled on its exterior to form cam portion 42, the operation of which will be described further in the specification. It is to be noted that the top plate 22 is attached to housing 26 by screw type of fastening means. Similarly, the same type of fastening means is employed to attach the base plate 24 and integral housing 26 to the aircraft floor 14. However, any such fastening means could be employed as the fastening means forms no part of this invention.

From the foregoing, the operation of the latch is felt to be obvious. However, to complete the explanation of the invention the latching procedure will now be described. With both latches 10 and 12 being correctly positioned on the aircraft floor 14, each end of bar 16 is placed adjacent the head portions 34 of the latches 10 and 12. Bar 16 is moved against the cam portions 42 of the head portions 34 and causes pivotal movement of arms 32 against the action of their respective springs 38. Once each end of the bar 16 closely approaches its respective abutment 40, the head portion 34 is extended by spring 38 and positions itself adjacent the trailing edge of bar 16 thereby preventing removal. In this position, bar 16 with respect to latch 10 would be allowed no movement except through the opening provided by the gap between the abutment 40 and head 34. However, such movement is not possible due to latch 12 located at the opposite end of bar 16. In this manner bar 16 is securely retained and ready to cause employment of the evacuation slide 18

If it is desirable to disengage bar 16 manually from latches 10 and 12 as use of slide 18 was not necessary, head portion 34 is movable against spring 38. To facilitate such movement, serrations 44 on head portion 34 are provided. Bar 16 is then storable and normal passenger disembarkment is permitted.

It is to be appreciated that the invention has been described in connection with a specific embodiment and that variations in the structure may be made without departing from the spirit and scope of the invention; and that the true scope of the invention is to be measured only by a just interpretation of the following claim.

I claim:
1. A latch assembly comprising:
   a pair of separate latch housings secured to a support and spaced apart a set distance, a latchable bar-like member to be retained intermediate said pair of latch housings, said latchable member having a pair of ends;
   each of said housings having an arm pivoted thereto and spring biased into a latched position, said arm including extremities comprising a latching head and a base, said latching head being capable of causing retention of said latchable member, said base forming the pivotal connection of said arm to its respective housing;
   each of said housings including a stationary abutment for engaging portions adjacent said ends, said latching head when in latched position being spaced from said abutment thereby holding said portion against said abutment, said arm having its said portion extending across the respective bar end and serving as a stop against endwise movement of said bar;
   a cam portion included on said latching head of said arm, said cam portion upon contact by said latchable member during placement of said latchable member into said latched position causes movement of said arm from said latched position against the spring bias to an unlatched position until said latchable member is completely positioned whereupon said arm moves to said latched position by the spring bias;
   means included upon each of said latching heads to facilitate manual movement of said latching heads from said latched position to an unlatched position; and
   each of said housings having an opening therein, said latching head of each of said arms protruding exteriorly from its respective opening, movement of said latching heads being limited by the edges of its respective opening.

References Cited

UNITED STATES PATENTS

| | | | |
|---|---|---|---|
| 2,030,960 | 2/1936 | Burns | 248—267 |
| 2,664,610 | 1/1954 | Hannemann. | |
| 2,669,494 | 2/1954 | Lenz. | |
| 2,689,607 | 9/1954 | Loucony | 248—267 X |
| 3,090,092 | 5/1963 | Szemplak. | |

BERNARD A. GELAK, *Primary Examiner.*

U.S. Cl. X.R.

193—25